June 17, 1930.  A. C. SAVIDGE  1,764,184
VALVE SEAT REAMER
Filed March 2, 1923
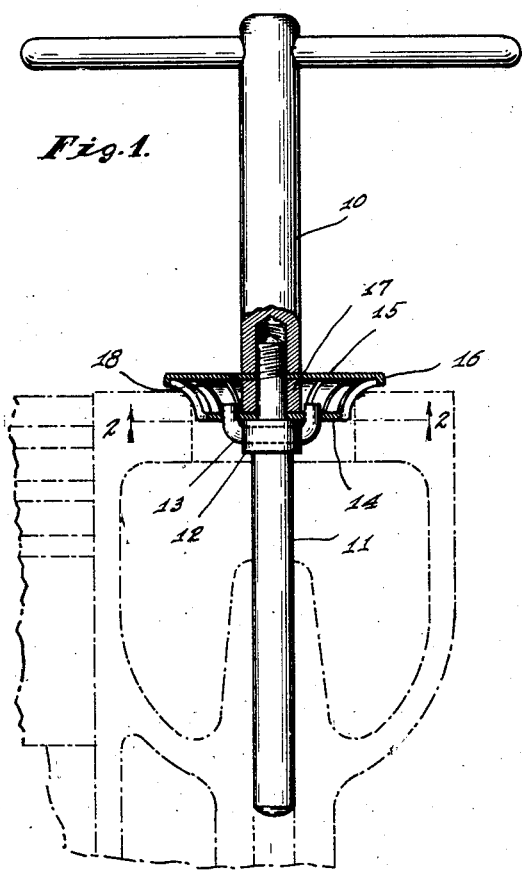
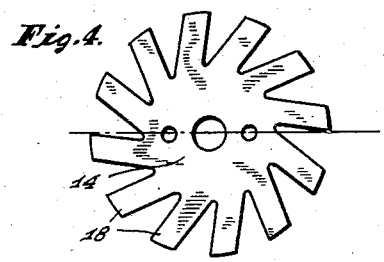
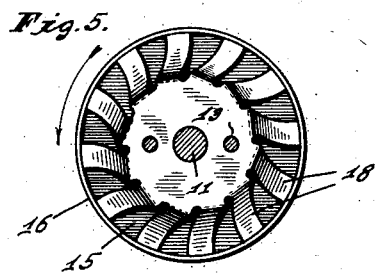
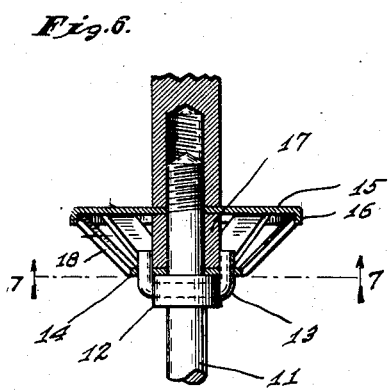
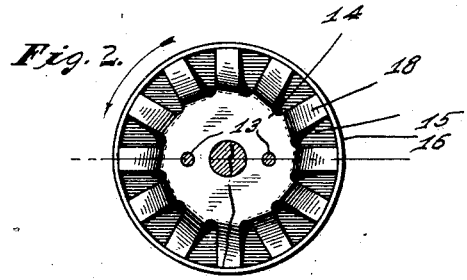
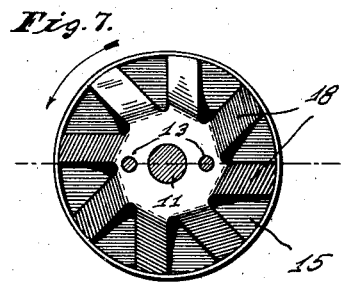
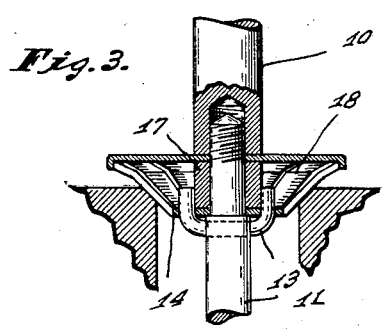
INVENTOR.
ALBERT C. SAVIDGE,
BY
ATTORNEY.

Patented June 17, 1930

1,764,184

UNITED STATES PATENT OFFICE

ALBERT C. SAVIDGE, OF INDIANAPOLIS, INDIANA

VALVE SEAT REAMER

Application filed March 2, 1923. Serial No. 622,397.

It is the object of my invention to produce a simple, economically constructed reamer of the type used for re-facing valve seats, which reamer shall have a separable cutting element which, while it can easily be re-sharpened, can be made and sold at such a low price that it will not be uneconomical to permanently discard it when dull and replace it with a new one. A further object of my invention is to make it possible, when desired, for any one or more teeth which become dull to yield automatically and allow other and sharper teeth to engage the valve seat. Still another object of my invention is to give to the cutting element, when desired, a tendency to hold to the valve seat by its own action, thus eliminating chatter and the necessity for the application of excessive pressure to the reamer and producing a smooth surface on the valve seat.

I accomplish these objects by using a cutting member former of a metal stamping, which is most conveniently a steel stamping of either high-carbon or low-carbon steel, and which, subsequent to forming, is heat-treated to produce the cutting qualities necessary in the use to which it is to be put; and I provide for this cutting element a suitable holder, including a guide for the reamer and means for turning it.

The accompanying drawing illustrates my invention: Fig. 1 is an elevation of a device embodying my invention, in the form used on Ford cars, in working position on the valve seat; Fig. 2 is a section on the line 2—2 of 1; Fig. 3 is a fragmentary elevation of a modification of my device designed to produce a conical valve seat and to prevent such valve seat from attaining an excessive width if re-faced many times; Fig. 4 is a plan of a cutting-element blank before forming, in which the teeth are so shaped that the cutting edge will be helical or quasi-helical after forming; Fig. 5 is a section similar to Fig. 2, but showing the blank of Fig. 4 formed to shape; Fig. 6 is a fragmental elevation of another modification, in which the cutting element is designed to produce a conical valve-seat face; and Fig. 7 is a section on the line 7—7 of Fig. 6.

My reamer is provided with the usual T-handle 10 and with a guiding portion 11, which latter has its upper end screw-threaded to engage an internally threaded hole in the lower end of the T-handle 10. An upwardly facing abutment or shoulder is provided on the guiding portion 11, below its screw threads, as by a collar 12 attached to the guiding portion 11 by a pin 13 as shown in Figs. 1 and 6, or by reducing the upper end of the guiding portion as shown in Fig 3, or both. This shoulder merely serves the purpose of supporting a cutting element 14. One or both ends of the pin 13 are bent upward to enter mating holes in the cutting element 14, thus keying said cutting element to the guiding portion 11.

The cutting element 14 is provided with cutting teeth 18; which may be of any desired form, though I prefer to make them of such shape that the lower end of the cutting edge will have an angular lead over the upper end, as thereby the reaction of the valve seat on the cutting element will have a downward component which tends to hold the reamer against the seat, thus eliminating chatter and consequent roughness of finish. This particular form of tooth, however, is not essential to my invention; and cutting elements in which this feature is lacking, as shown for example in Fig. 7, are equally within the scope of my invention save when otherwise expressly specified. A disk 15, spaced from the cutting element 14 by a spacer 17, is provided with a downwardly projecting peripheral rim 16 which serves to hold in place the upper end of the teeth 18. The cutting element 14, spacer 17, and rimmed disk 15 are clamped between the shoulder on the guiding portion 11 and the lower end of the T-handle 10.

I prefer to make the cutting element 14 of sheet steel, of a thickness commensurate with its diameter and the use to which the reamer is to be put. From a sheet of steel having the desired thickness I cut a circular blank provided around its circumference with a series of notches which may be of various shapes. One such blank is shown in Fig. 4. After blanking, the stamping 17 is formed to shape, which may be such as to conform to any desired shape of valve-seat face. In the forming operation, the teeth are so bent as to provide clearance for the cutting edge; in other words, the outer face of the tooth is relieved so that the cutting edge is the only portion of the tooth which engages the valve seat. The teeth should be so relieved that re-sharpening will not change their shape.

After giving the cutting element the desired form, I subject it to a suitable heat treatment so that it will have the desired cutting qualities. After hardening, the cutting-element is completed by sharpening the teeth.

The disk 15 is preferably a sheet-steel stamping, of such a diameter that when the cutting element 14 is clamped in working position its teeth will fit snugly within the downwardly projecting rim 16. Should any of the teeth of the cutting element 14 warp or spring in the course of the hardening operations, they will be held in place by the rim of the disk 15.

The reamer shown in Fig. 3 is provided with a cutting element, the lower part of which re-faces that part of the valve seat which the valve engages. The upper part of the cutting element forms a cone having a wider angle than has the lower part. This feature prevents the valve-seat face from becoming too wide after numerous re-facings.

The cutting-elements shown in plan in Figs. 2 and 5 will each have a tendency to hold to the valve seat while cutting, owing to the fact that the lower end of the cutting edge of each tooth is in advance of the upper end in the direction of rotation. In the cutting element shown in Fig. 2 this advance is only slight, with the result that this form will have a correspondingly small tendency to hold to the seat; while in the cutting element shown in Fig. 5 the advance is much more pronounced and the tendency to hold to the valve-seat will be correspondingly greater. The cutting-element shown in Fig. 7 has no advance; in other words, the cutting edge is co-planar with the axis of the guiding portion 11.

By constructing the cutting-element of a metal stamping in the manner described, I am able to place on the market a very low priced reamer, new cutters for which may be economically substituted for dull ones, just as a new safety razor blade is substituted for an old one. However, if desired, the cutting element may be easily re-sharpened by removing it from the reamer and grinding the cutting edges of the teeth 18, on an ordinary thin grinding wheel. If desired, the cutting element may be constructed of relatively thin metal, so that there is a certain amount of spring in each tooth; and so that if one projects beyond the others or becomes dull, it will yield and allow other and sharper teeth to engage the valve-seat.

I claim as my invention:

1. A valve-seat reamer, comprising a handle, a shouldered guiding portion, a toothed sheet-metal member, a supporting member for supporting the outer ends of the teeth of said toothed member, and means for clamping said toothed member and said supporting member between said handle and the shoulder on said guiding portion.

2. A valve-seat reamer, comprising a handle, a shouldered guiding portion, a cutting element formed of a central portion provided around its circumference with a plurality of cutting teeth integral with said central portion but bent out of its plane, a disk having a projecting flange which engages the outer end of said cutting teeth, and means for clamping said cutting element and said disk in spaced relation between said handle and the shoulder on said guiding portion.

3. A valve-seat reamer for conical valve seats, comprising an operating member, a guide stem substantially co-axial with said operating member, a cutting element, said cutting element being formed from a disk of sheet metal having a circumferential series of notches each extending inward from the periphery of the disk to form a plurality of outwardly extending relatively flexible fingers, said fingers being bent out of the plane of the central portion of the disk to form a conical series of cutting teeth with the breadth of each tooth extending circumferentially, a supporting member for supporting the teeth of said cutting element, and means for holding said supporting member and cutting element in fixed relation relative to said operating member.

4. A valve-seat reamer as set forth in claim 3 with the addition that said teeth are bent so that their outer surfaces lie radially inward from the respective cutting edges to provide clearance.

5. A valve-seat reamer for conical valve seats, comprising an operating member, a guide stem substantially co-axial with said operating member, a sheet-metal cutting element having a conical series of angularly spaced relatively flexible cutting teeth disposed with their breadth extending circumferentially, a supporting member for supporting the teeth of said cutting element, and means for releasably holding said cutting element, supporting member and guide stem in fixed relative positions.

6. A valve-seat reamer for conical valve seats, comprising an operating member, a guide stem substantially co-axial with said operating member, a sheet-metal cutting element having a conical series of angularly spaced relatively flexible cutting teeth, a supporting member for supporting the teeth of said cutting element, and means for releasably holding said cutting element, supporting member and guide stem in fixed relative positions, said teeth being bent so that their outer surfaces lie radially inward from the respective cutting edges to provide clearance.

7. A valve-seat reamer for conical valve seats, comprising an operating member, a guide stem substantially co-axial with said operating member, a sheet-metal cutting element having a central plane portion and a conical series of relatively flexible cutting teeth extending from said plane central portion and lying wholly on one side thereof with their breadth extending circumferentially, a supporting member for supporting the teeth of said cutting element, and means releasably holding said cutting element, supporting member and guide stem in fixed relative positions.

8. A valve-seat reamer for conical valve seats, comprising an operating member, a guide stem substantially co-axial with said operating member, a sheet-metal cutting element having a central plane portion and a conical series of relatively flexible cutting teeth extending from said plane central portion and lying wholly on one side thereof with their breadth extending circumferentially, a supporting member for supporting the teeth of said cutting element, and means releasably holding said cutting element, supporting member and guide stem in fixed relative positions, said teeth being bent so that their outer surfaces lie radially inward from the respective cutting edges to provide clearance.

9. A cutting element for conical valve-seat reamers, comprising a circular disk having a circumferential series of notches extending inwardly from its periphery to provide a series of spaced fingers extending outwardly from the central portion of the disk, said fingers being bent out of the plane of said central portion to form a conical series of cutting teeth with the breadth of each tooth extending circumferentially, said teeth being bent so that their outer surfaces lies radially inward from the cutting edges to provide clearance.

10. A valve-seat reamer for conical valve seats, comprising an operating member, a sheet-metal cutting element having a conical series of angularly spaced relatively flexible cutting teeth disposed with their breadth extending circumferentially, a supporting member for supporting the teeth of said cutting element, and means for releasably holding said cutting element, supporting member, and operating member in fixed relative positions.

11. A valve-seat reamer, comprising a guide stem, a cutting element formed from a disk of sheet-metal having a circumferential series of notches each extending inward from the periphery of the disk to form a plurality of relatively flexible cutting teeth with the breadth of each tooth extending circumferentially, a supporting member for supporting said cutting teeth, and means for holding said supporting member, cutting element, and guide stem in fixed relation.

In witness whereof, I have hereunto set my hand at Indianapolis, Indiana, this 28th day of February, A. D. one thousand nine hundred and twenty three.

ALBERT C. SAVIDGE.